US005727998A

United States Patent [19]
Krueger et al.

[11] Patent Number: 5,727,998
[45] Date of Patent: Mar. 17, 1998

[54] SIDE VENT FRAME FOR A RECREATIONAL VEHICLE

[75] Inventors: Gerald W. Krueger, Connersville; Patrick N. McConnell, Goshen, both of Ind.

[73] Assignee: White Consolidated Industries, Inc., Cleveland, Ohio

[21] Appl. No.: 746,853

[22] Filed: Nov. 18, 1996

[51] Int. Cl.[6] .................................................. B60H 1/26
[52] U.S. Cl. ........................ 454/143; 454/276; 454/277
[58] Field of Search ............................ 454/82, 107, 143, 454/271, 276, 277, 283

[56] References Cited

U.S. PATENT DOCUMENTS

| | | |
|---|---|---|
| 3,245,224 | 4/1966 | Wilkinson . |
| 4,274,330 | 6/1981 | Witten et al. ........................... 454/276 |
| 4,509,354 | 4/1985 | Suzuki et al. . |
| 4,711,160 | 12/1987 | Witten et al. ........................... 454/283 |
| 5,176,570 | 1/1993 | Liedl . |
| 5,349,799 | 9/1994 | Schiedegger et al. .............. 454/277 X |

*Primary Examiner*—Harold Joyce
*Attorney, Agent, or Firm*—Pearne, Gordon, McCoy & Granger LLP

[57] ABSTRACT

A vent cover assembly for a side vent of a recreational vehicle which includes a frame to be mounted at the vent opening and a vent cover removably retained within the frame. The frame has a planar main wall which forms a rectangular-shaped central opening and rectangularly-shaped and vertically spaced apart air inlets at each lateral side of the central opening. The vent cover is removably retained within the central opening of the frame such that a front surface of the vent cover is co-planar with a front surface of the frame. The vent cover has a planar main wall which forms a plurality of rectangularly-shaped and vertically spaced apart air inlets. The air inlets of the frame effectively form extensions of the air inlets of the vent cover.

20 Claims, 5 Drawing Sheets

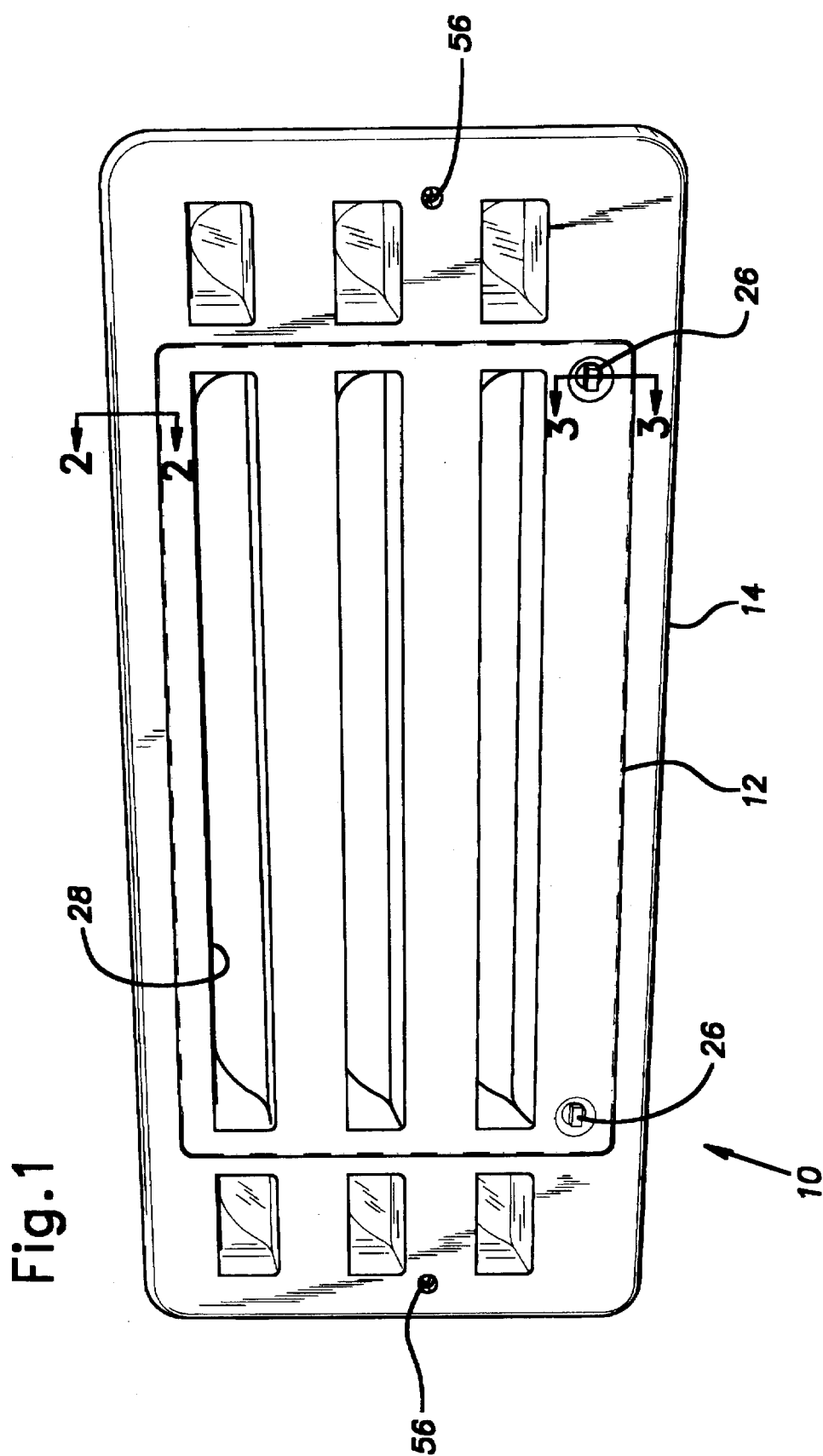

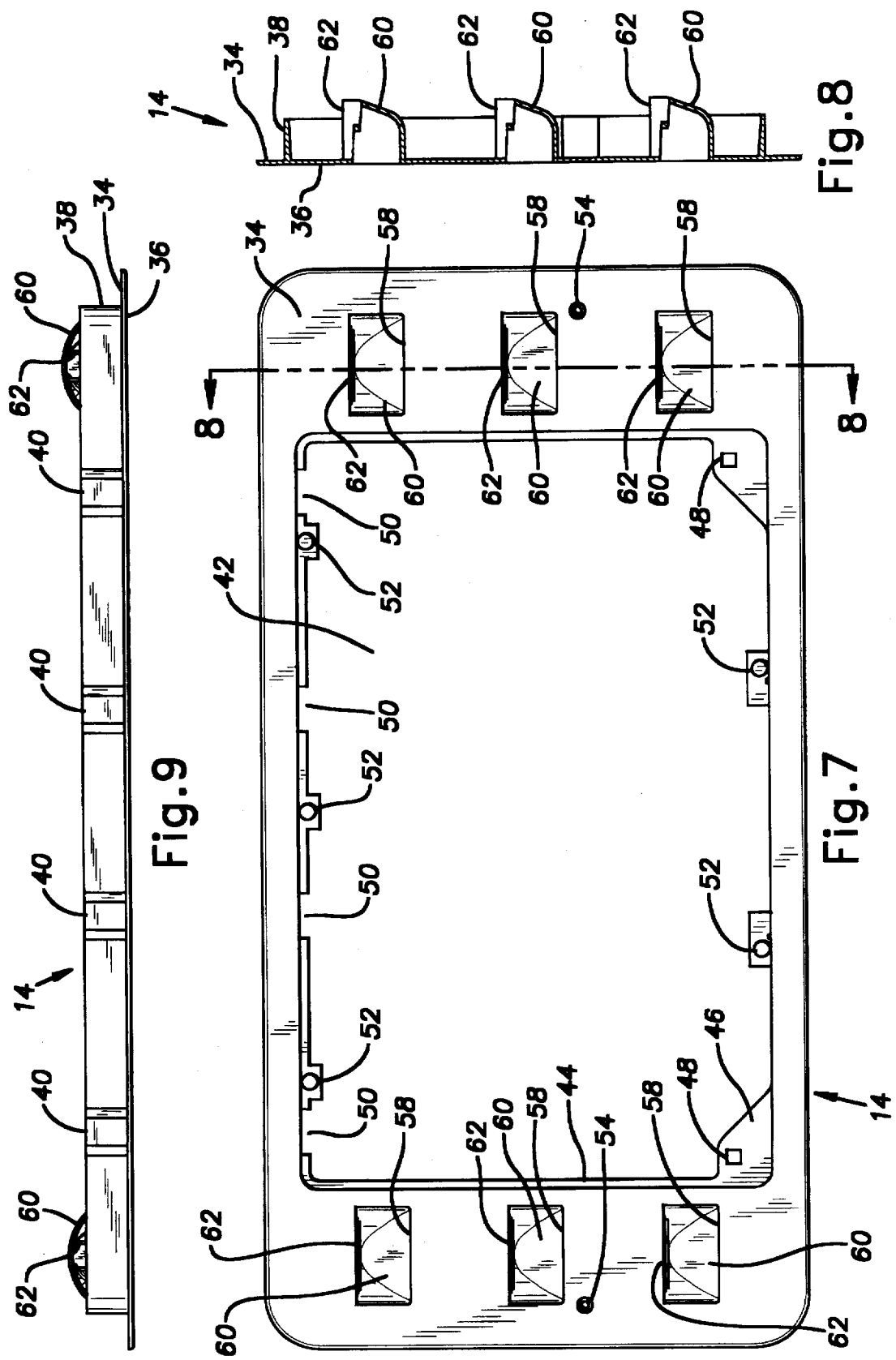

# SIDE VENT FRAME FOR A RECREATIONAL VEHICLE

BACKGROUND OF THE INVENTION

1. Field of the Invention

The present invention generally relates to an air-intake vent cover and, more particularly, to a vent cover assembly for a side vent of a recreational vehicle.

2. Description of Related Art

Recreational vehicles such as campers, trailers, and similar vehicles, often have vent openings in an outside wall along the side of the vehicle to provide a source of outside air. For example, many recreational vehicles have butane or propane refrigerators which require a supply of air for combustion and to carry off the combustion products. The vent opening typically has a vent cover mounted at the outside of the vehicle. The vent cover typically has horizontally extending air inlets provided with louvers for directing the incoming air in an upward direction.

The vent openings are of varying width depending on the amount of air flow required. Narrow vent openings typically have a molded plastic vent cover which can be mass produced at a relatively low cost. Wide vent openings, however, can require relatively expensive metal formed and fabricated vent cover assemblies. Accordingly, there is a need in the art for an improved vent cover assembly for wide vent openings which can be produced at a relatively low cost.

SUMMARY OF THE INVENTION

The present invention provides a vent cover assembly for a vent opening which overcomes at least some of the above-noted problems of the related art. According to the present invention, the vent cover assembly includes a frame adapted to be mounted at the vent opening and a vent cover removably secured to the frame. The frame has a main wall forming an opening and air inlets. The vent cover is removably retained within the opening of the frame main wall. The vent cover has a main wall forming a plurality of air inlets therein. Preferably, the air inlets of the frame effectively form extensions of the air inlets of the vent cover. The vent cover assembly of the present invention enables a standard small or narrow vent cover to be used in a wider vent opening while providing increased air intake area.

According to a preferred embodiment of the invention, the main wall of the frame is generally planar and the frame has a flange perpendicularly extending from a rear surface of the main wall for extending into the vent opening. Therefore, the entire frame can be advantageously concealed within the vent except for the main wall of the frame.

According to further preferred embodiments of the present invention, the main wall of the frame has a generally planar front surface and the main wall of the vent cover has a generally planar front surface. The front surface of the frame main wall is generally co-planar with the front surface of the vent cover main wall. Preferably, the frame has a flange generally parallel to the frame main wall and rearwardly spaced from the frame main wall which forms a recessed seat for the vent cover within the opening. Therefore, the vent cover can be advantageously concealed entirely within the frame.

BRIEF DESCRIPTION OF THE DRAWINGS

These and further features of the present invention will be apparent with reference to the following description and drawings, wherein:

FIG. 1 is a perspective view of an air-intake vent cover assembly according to the present invention;

FIG. 7 is a front elevational view of a vent cover frame of FIG. 1;

FIG. 8 is a side elevational view of the vent cover frame of FIG. 7;

FIG. 9 is a top plan view of the vent cover frame of FIG. 7; and

DETAILED DESCRIPTION OF THE PREFERRED EMBODIMENT

FIG. 1 illustrates an air-intake vent cover assembly 10 according to the present invention for a side vent of a recreational vehicle such as campers, trailers, and similar vehicles. The vent cover assembly 10 includes a vent cover 12 which is removably mounted within a vent cover frame 14.

Figure 2:
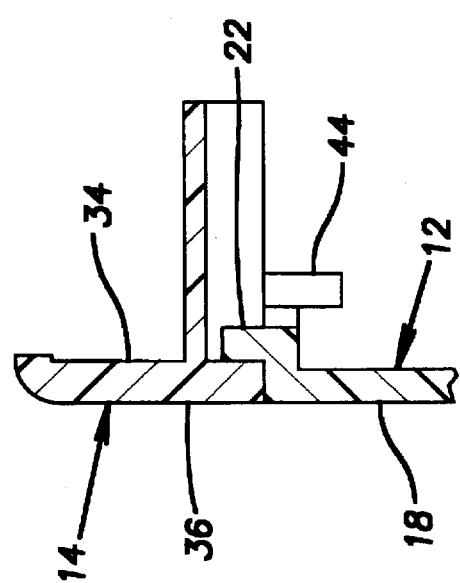
FIG. 2 is an enlarged cross-sectional view taken along line 2—2 of FIG. 1.
Figures 4, 5, 6:
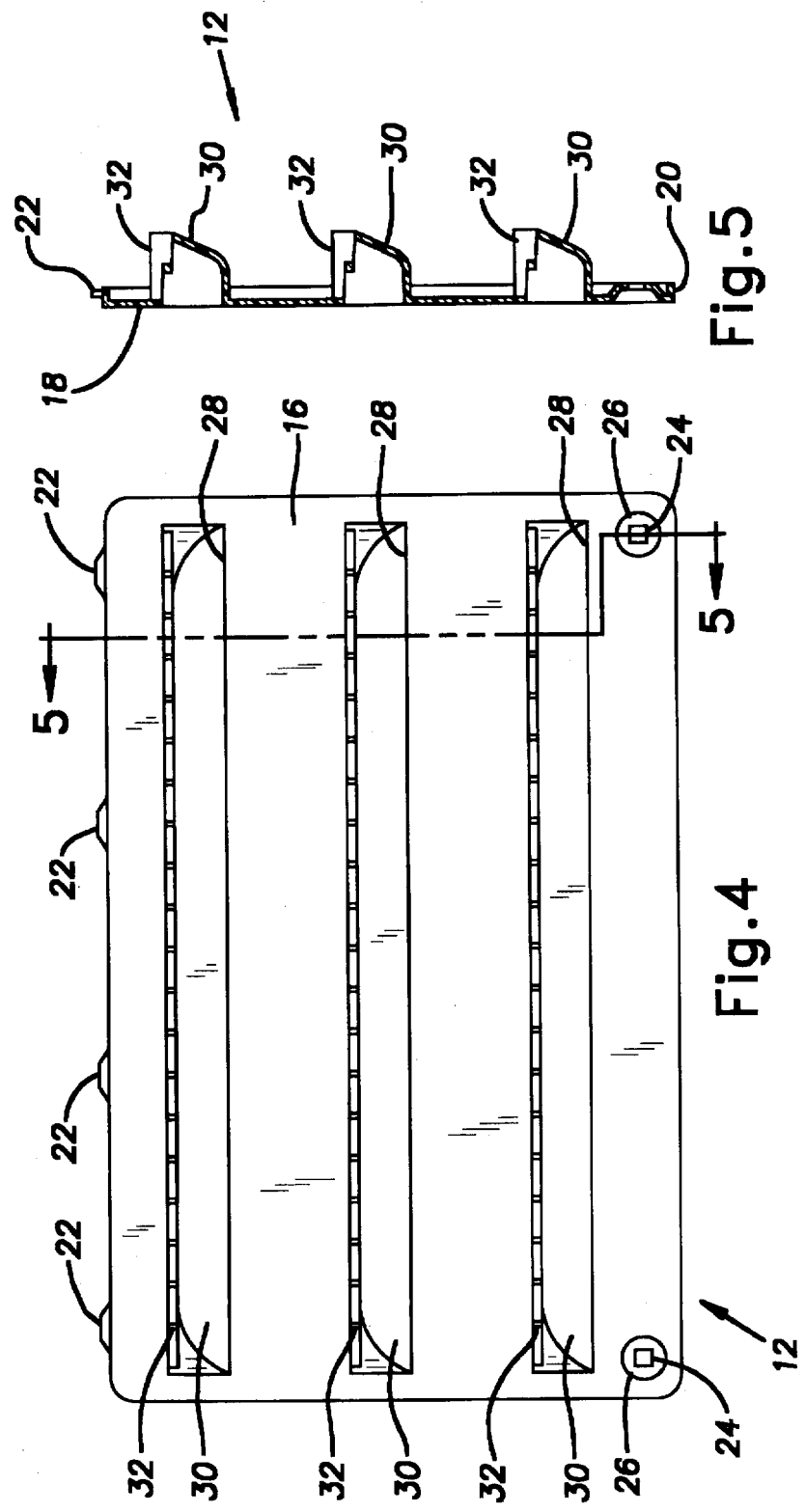
FIG. 4 is a front elevational view of a vent cover of FIG. 1.
FIG. 5 is a side elevational view, in cross, section, of the vent cover taken along line 5—5 of FIG. 4.
FIG. 6 is a top plan view of the vent cover of FIG. 4.

The vent cover 12 is preferably molded of a suitable plastic material such as, for example, rubber modified polystyrene. As best shown in FIGS. 4–6, the vent cover 12 has a generally rectangularly-shaped and planar main wall 16. The main wall 16 has a substantially planar front surface 18. A flange 20 rearwardly extends from the periphery of the main wall 16. Mounting tabs 22 upwardly extend from the flange 20 at the top of the vent cover 12. The illustrated vent cover 12 has four horizontally spaced apart mounting tabs 22 but other quantities of mounting tabs 22 can be utilized. The mounting tabs 22 are preferably rearwardly spaced from the front surface 18 of the main wall 16 so that the front surface 18 of the vent cover can be flush, that is generally co-planar, with the vent cover frame 14 (best shown in FIG. 2).

A pair of openings or apertures 24 are provided near the bottom corners of the main wall 16. The apertures 24 receive fasteners 26 (FIG. 1) which removably attach the vent cover 12 to the vent cover frame 14 as will be described in more detail hereafter. The apertures 24 are preferably located in a rearwardly extending recess 26 in the main wall 16 so that the fasteners 26 are recessed substantially rearward, and more preferably entirely rearward, of the front surface 18 of the main wall 16. The apertures 24 of the illustrated embodiment are generally square-shaped.

A plurality of generally rectangularly-shaped openings or air inlets 26 are provided in the main wall 16. The elongate air inlets 28 extend substantially horizontal and are vertically spaced apart. The illustrated vent cover 12 has three air inlets 28 but other quantities can be alternatively utilized. It is also noted that the air inlets 28 can alternatively have other shapes or sizes within the scope of the present invention.

Each air inlet 28 is preferably provided with a louver 30 to direct air passing through the air inlets 28 in a desired direction. The louvers 30 are preferably integral with the main wall 16 and extend rearwardly from the rear side of the main wall 16. The illustrated louvers 30 are formed to redirect incoming air about 90 degrees by having an inlet in a generally vertical plane and an outlet in a generally horizontal plane. Air flows through the air inlets 28 in a generally horizontal and rear direction and is redirected by the louvers 30 to a generally vertical and upward direction. The ends of the louvers 30 are preferably formed to inwardly direct the air at the ends of the air inlets. Integral and generally horizontally extending grilles 32 are preferably provided at the outlets of the louvers 30.

The vent cover frame 14 is preferably molded of a suitable plastic material such as, for example, rubber modified polystyrene. As best shown in FIGS. 7–10, the vent cover frame 14 has a generally rectangularly-shaped and planar main wall 34. The main wall 34 has a substantially planar front surface 36. A flange 38 perpendicularly and rearwardly extends from the rear surface of the main wall 34 and is inwardly spaced from the periphery of the main wall 34. The flange 38 is sized is sized to closely fit within the vent opening so that the rear surface of the main wall 34, outside the flange 38, engages the external surface of the outside wall of the recreational vehicle. The flange 38 has upwardly extending recesses or pockets 40 for receiving the mounting tabs 22 of the vent cover 12. The pockets 40 are shaped to conform to the mounting tabs 22 and to closely receive the mounting tabs 22.

Figure 10:
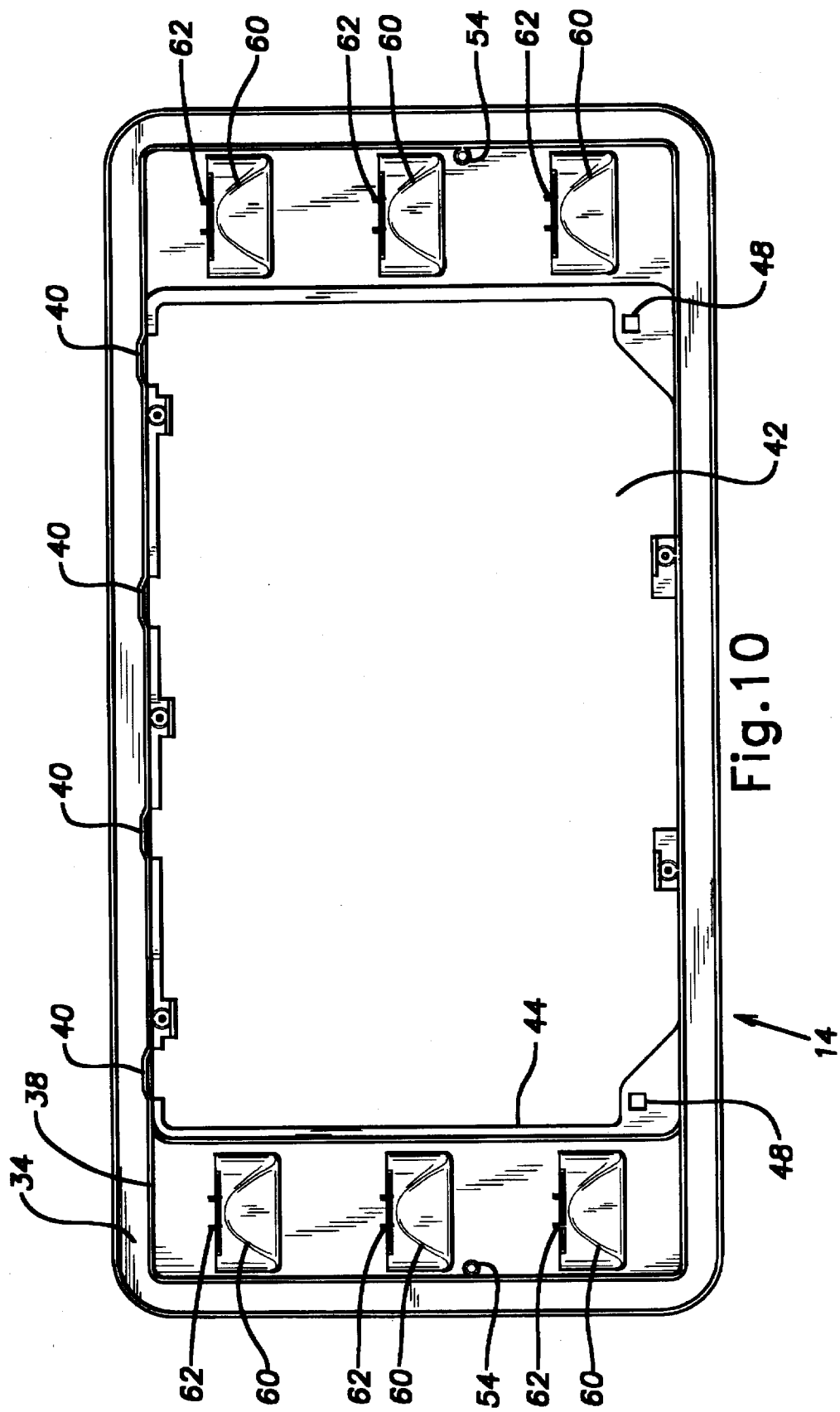
FIG. 10 is a rear elevational view of the vent cover frame of FIG. 7.

A generally rectangularly-shaped central opening 42 is provided in the main wall 34 which is sized for receiving the vent cover 12. As best shown in FIG. 10, the central opening 42 extends the full distance between the flange 38 in the vertical direction and is spaced from the flange 38 in the horizontal direction. An inwardly extending flange 44 is provided generally about the periphery of the central opening 42. The flange 44 forms a front surface 46 generally parallel to, and rearwardly spaced from, the front surface 36 of the main wall 34. The flange 44 forms a rear abutment or seat for receiving the flange 20 of the vent cover 12 to position the vent cover 12 within the vent cover frame 14. The front surface 46 of the flange 44 is rearwardly spaced, from the front surface 36 of the vent cover frame 14, a distance adequate to position the front surface 18 of the vent cover 12 generally co-planar with the front surface 36 of the vent cover frame 14.

The flange 44 is provided with a pair of openings or apertures 48 near the bottom corners of the central opening 42, and aligned with the apertures 24 of the vent cover 12, for passage of the fasteners 26 to attach the vent cover 12 to the vent cover frame 14. The apertures 48 of the illustrated embodiment are generally square-shaped. The flange 44 is also provided with breaks or openings 50 for passage of the mounting tabs 22 of the vent cover 12. It is noted that the flange 44 is preferably provided with a plurality of contact seats 52. The illustrated vent cover frame 14 has three contact seats 52 spaced across the top of the central opening 42 and two contact seats 52 spaced across the bottom of the central opening 42. It is also noted that the flange 44 can be broken or non-continuous about the periphery of the central opening 42 as illustrated in FIGS. 7 and 10.

A pair of mounting openings 54 are provided near the ends of the main wall 34. The mounting openings 54 are sized and shaped to receive fasteners 56 (FIG. 1), such as the illustrated screws, which attach the vent cover frame 14 to the air-intake or vent opening. The mounting openings 54 are preferably formed with a recess or counterbore so that the fasteners 56 are recessed substantially rearward, and more preferably entirely rearward, of the front surface 36 of the main wall 34.

A plurality of generally rectangularly-shaped openings or air inlets 58 are provided in the main wall 34 laterally outward of the central opening 42 and within the flange 38. The elongate air inlets 58 extend substantially horizontal and are vertically spaced apart. The illustrated vent cover frame 14 has three openings at each side of the central opening 42 so the air inlets 58 generally form extensions of the three air inlets 28 of the vent cover 12. It is noted that other quantities of air inlets 58 can be alternatively utilized. It is also noted that the air inlets 58 can alternatively have other shapes or sizes within the scope of the present invention.

Each air inlet 58 is preferably provided with a louver 60 to direct air passing through the air inlet 58 in a desired direction. The louvers 60 are preferably integral with the main wall 34 and extend rearwardly from the rear side of the main wall 34. The illustrated louvers 60 are formed to redirect incoming air about 90 degrees by having an inlet in a generally vertical plane and an outlet in a generally horizontal plane. Air flows through the air inlets 58 in a generally horizontal and rear direction and is redirected by the louvers 60 to a generally vertical and upward direction. The ends of the louvers 60 are preferably formed to inwardly direct the air at the ends of the air inlets 58. Integral and generally horizontally extending grilles 62 are preferably provided at the outlets of the louvers 60.

Figure 3B:
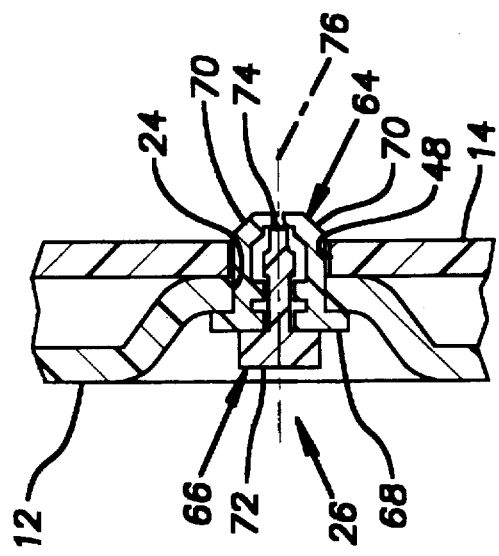
FIG. 3A and 3B show enlarged cross-sectional views taken along line 3—3 of FIG. 1 FIG. 3A showing locking member arms in an outwardly deflected locking position and FIG. 3B showing the arms in an undeflected position.
Figure 3A:
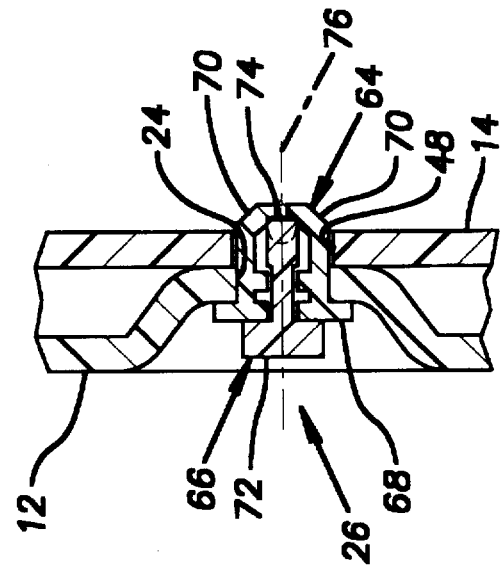

In the illustrated embodiment, the fasteners 26 (FIG. 1) which removable attach the vent cover 12 to the vent cover frame 14 are secured to the vent cover 12. As best shown in FIGS. 3A and 3B, each of the fasteners 26 include a locking member 64 and a knob member 66. The locking member 64 includes flange 68 with a central opening and a pair of flexible arms 70 rearwardly extending from the flange 68 through the openings 24, 48 in the vent cover 12 and the vent cover frame 14. The locking member 64 is longitudinally retained within the opening 24 of the vent cover 12 and preferably cannot rotate relative thereto. The knob member 66 has a knob 72 and a shaft 74 extending rearwardly therefrom through the opening in the locking member 64. The knob member 66 is longitudinally retained within the locking member 64 and is rotatable relative to the locking member 64 about a central axis 76. The rear end of the shaft 74 is sized for engaging and outwardly deflecting the arms 70 of the locking member 64 in a first plane (best shown in FIG. 3A) so that the arms 70 cannot be withdrawn from the opening 48 in the vent cover frame 14 and for allowing the arms 70 of the locking member 64 to be undeflected in a second plane generally perpendicular to the first plane (best shown in FIG. 3B) so that the arms 70 can be withdrawn from the opening 48 in the vent cover frame 14.

It is noted that other types of fasteners 26 can be alternatively utilized to removably attach the vent cover 12 to the vent cover frame 14. The fasteners 26 are preferably operated without the use of tools and/or are preferably secured to either the vent cover 12 or the vent cover frame 14.

The vent cover assembly 10 is installed by first inserting the flange 38 of the vent cover frame 14 into the vent opening, at the exterior of the recreational vehicle, until the rear surface of the frame main wall 34 engages the exterior surface of the recreational vehicle side wall. It is noted that the only portion of the vent cover frame 14 which is outside the side wall of the recreational vehicle is the main wall 34 of the vent cover frame 14. The fasteners 56 are inserted through the mounting openings 54 in the main wall 34 of the vent cover frame 14 and are secured to the side wall of the recreational vehicle. It is noted that the mounting openings 54 are recessed so that the fasteners 56 are below the front surface 36 of the vent cover frame 14.

The vent cover 12 is attached to the vent cover frame 14 by inserting the mounting tabs 22 of the vent cover 12 behind the main wall 34 of the vent cover frame 14, at the breaks 50 in the flange 44, with the vent cover 12 tilted at an angle relative to the vent cover frame 14. Once the mounting tabs 22 are inserted, the bottom of vent cover 12 is swung down toward the vent cover frame 14 until the vent cover 12 is seated within the central opening 42 of the vent cover frame 14 and against the flange 44 of the vent cover frame 14 with the fasteners 26 inserted through the apertures 48 of the vent cover frame 14. The knob portions 66 of the fasteners 26 are then rotated about 90 degrees to secure the bottom of the vent cover 12 to the vent cover frame 14.

Attached in this manner, the vent cover 12 is securely held within the central opening 42 of the vent cover frame 14 with the front surface 18 of the vent cover 12 generally co-planar with the front surface 36 of the vent cover frame 14. Rearward movement of the vent cover 12 relative to the vent cover frame 14 is prevented by engagement between flange 20 of the vent cover 12 and the flange 44 of the vent cover frame 14. Forward movement of the vent cover 12 relative to the vent cover frame 14 is prevented by engagement between the mounting tabs 22 of the vent cover 12 and the main wall 34 of the vent cover frame 14 along with the fasteners 26 secured to the vent cover 12 and extending through the apertures 48 in the vent cover frame 14. To remove the vent cover 12 from the vent cover frame 14, the above described procedure is reversed.

Incoming air passes through the air inlets 28, 58 of the vent cover 12 and the vent cover frame 14 and is upwardly directed by the louvers 30, 60. It can be appreciated from the above description that the vent cover assembly 10 uses a relatively small vent cover 12 for relatively wide vent openings without decreasing the total air inlet area. Accordingly, a standard small vent cover 12 can be utilized for various sized vent openings.

Although particular embodiments of the invention have been described in detail, it will be understood that the invention is not limited correspondingly in scope, but includes all changes and modifications coming within the spirit and terms of the claims appended hereto.

What is claimed is:

1. A vent cover assembly for a vent opening comprising:
   a frame adapted to be mounted at the vent opening and having a main wall, said frame main wall forming an opening and air inlets; and
   a vent cover removably retained within said opening of said frame main wall and having a main wall, said vent cover main wall forming a plurality of air inlets.

2. The vent cover assembly according to claim 1, wherein said main wall of said frame is generally planar and said frame has a flange perpendicularly extending from a rear surface of said main wall for extending into the vent opening.

3. The vent cover assembly according to claim 1, wherein said main wall of said frame has a generally planar front surface, said main wall of said vent cover has a generally planar front surface, and said front surface of said frame main wall is generally co-planar with said front surface of said vent cover main wall.

4. The vent cover assembly according to claim 1, wherein said main wall of said frame is generally planar, said frame has a flange generally parallel to said main wall and rearwardly spaced from said main wall, and said flange forms a seat for said vent cover within said opening of said frame main wall.

5. The vent cover assembly according to claim 1, wherein said air inlets of said frame main wall are generally horizontally-shaped and generally horizontally extending.

6. The vent cover assembly according to claim 1, wherein each of said air inlets of said frame main wall is provided with a louver for upwardly directing air which flows through said air inlets of said frame main wall.

7. The vent cover assembly according to claim 1, wherein said opening of said frame main wall is generally rectangularly-shaped.

8. The vent cover assembly according to claim 7, wherein said air inlets of said frame main wall are generally rectangularly-shaped and generally horizontally extending.

9. The vent cover assembly according to claim 7, wherein said air inlets of said frame main wall are located laterally outward of each end of said opening.

10. The vent cover assembly according to claim 7, wherein said air inlets of said vent cover main wall are generally rectangularly-shaped and vertically spaced apart.

11. The vent cover assembly according to claim 10, wherein said air inlets of said frame main wall effectively form extensions of said air inlets of said vent cover main wall.

12. The vent cover assembly according to claim 11, wherein said opening of said frame main wall is generally rectangularly-shaped and said air inlets of said frame main wall are located laterally outward of each end of said opening.

13. A vent cover assembly for a side vent opening of a recreational vehicle, said vent cover assembly comprising:
   a frame adapted to be mounted at the vent opening and having a generally planar main wall, said main wall of said frame forming a generally rectangular-shaped central opening and generally rectangularly-shaped and vertically spaced apart air inlets located laterally outward of each end of said central opening; and
   a vent cover removably retained within said central opening of said frame main wall and having a generally planar main wall, said main wall of said vent cover forming a plurality of generally rectangularly-shaped and vertically spaced apart air inlets, said air inlets of said frame main wall effectively forming extensions of said air inlets of said vent cover main wall.

14. The vent cover assembly according to claim 13, wherein said frame has a flange perpendicularly extending from a rear surface of said frame main wall for extending into the vent opening.

15. The vent cover assembly according to claim 13, wherein said main wall of said frame has a generally planar front surface, said main wall of said vent cover has a generally planar front surface, and said front surface of said frame main wall is generally co-planar with said front surface of said vent cover main wall.

16. The vent cover assembly according to claim 13, wherein said frame has a flange generally parallel to said frame main wall and rearwardly spaced from said frame main wall, and said flange forms a seat for said vent cover within said central opening of said frame main wall.

17. The vent cover assembly according to claim 13, wherein each of said air inlets of said frame main wall and each of said air inlets of said vent cover main wall is provided with a louver for upwardly directing air which flows through said air inlets.

18. A vent cover frame for a side vent cover of a recreational vehicle, said vent cover frame comprising:
- a generally planar main wall;
- a generally rectangular-shaped central opening formed in said main wall; and
- generally rectangularly-shaped and vertically spaced apart air inlets formed in said main wall, said air inlets located laterally outward of each end of said central opening.

19. The vent cover frame according to claim 18, further comprising a flange generally parallel to main wall and rearwardly spaced from said main wall, said flange forming a seat for the vent cover within said central opening of said main wall.

20. The vent cover assembly according to claim 18, wherein each of said air inlets is provided with a louver for upwardly directing air which flows through said air inlets.

* * * * *